UNITED STATES PATENT OFFICE.

HERMAN FALK, OF NASHVILLE, TENNESSEE.

IMPROVEMENT IN MEDICAL COMPOUNDS.

Specification forming part of Letters Patent No. 202,801, dated April 23, 1878; application filed May 27, 1876.

*To all whom it may concern:*

Be it known that I, HERMAN FALK, of Nashville, in the county of Davidson and State of Tennessee, have discovered a new and useful Medical Compound for Chills and Fever, which is fully described in the following specification.

The invention consists in a composition formed by mixing the following medicinal agents, substantially in the proportions named: Extract of zea mays, or Indian corn, fifty grains; sulphate of quinine, thirty-four grains; sulphuric acid, eighteen drops; extract allium sativum, ten drops.

The extract of zea mays, or Indian corn, is made by boiling the dry leaves of Indian corn in water. The boiling is continued until the material is formed into a thick gum. The other well-known ingredients are then mixed with this new element, substantially in the proportions specified. Enough pulverized liquiritia is then used to unite the ingredients and make the mass of a sufficient consistency to be formed into pills. The mass is then divided and rolled into thirty-six (36) pills.

I have discovered that the extract of zea mays is a very active agent in all derangements of the prima via, and the whole chylopoetic viscera, if said derangements are induced by atmospheric action. It operates as a stimulant on the bowels in case of atony, and stimulates the muscular fiber into action. It is also a very fine cholagogue, secreting bile under the most difficult circumstances; hence, when combined with the other well-known ingredients, the compound acts as a powerful and effective remedy in all malarial diseases.

Having thus described my invention, I claim—

The remedial composition for chills and fever, consisting of extract of zea mays, sulphate of quinine, sulphuric acid, and extract of allium sativum, substantially as described.

HERMAN FALK, M. D.

Witnesses:
T. W. HENSON,
P. SWAN.